United States Patent [19]
Lespade et al.

[11] Patent Number: 5,399,440
[45] Date of Patent: Mar. 21, 1995

[54] COMPOSITE MATERIAL WITH A GLASS-CERAMIC OR CERAMIC MATRIX OBTAINED BY THE SOL-GEL PROCESS AND REINFORCED BY FIBERS BASED ON SILICON CARBIDE, ITS MANUFACTURE AND ITS APPLICATIONS

[75] Inventors: Pierre Lespade, Merignac; Guy J. C. Larnac, St Medard en Jalles; Patrick Peres, St Medard en Jalles; Jean-Marc N. P. Donzac, St Medard en Jalles, all of France

[73] Assignee: Aerospatiale Societe Nationale Industrielle, Paris, France

[21] Appl. No.: 960,168

[22] Filed: Oct. 13, 1992

[30] Foreign Application Priority Data

Oct. 18, 1991 [FR] France ............................ 91 12873

[51] Int. Cl.$^6$ ............................................. B32B 18/00
[52] U.S. Cl. ..................................... 428/688; 428/292; 428/367; 428/689; 428/697; 428/698; 428/702; 428/902; 501/32; 501/87; 501/95
[58] Field of Search ............... 428/688, 689, 697, 698, 428/702, 292, 367, 902; 501/32, 87, 95

[56] References Cited

U.S. PATENT DOCUMENTS

| | | | |
|---|---|---|---|
| 4,324,843 | 4/1982 | Brennan | 428/698 |
| 5,126,087 | 6/1992 | Leopade | 264/60 |
| 5,132,178 | 6/1992 | Chyung | 428/698 |

FOREIGN PATENT DOCUMENTS

| | | |
|---|---|---|
| 2043757 | 6/1991 | Canada. |
| 0322295 | 6/1989 | European Pat. Off.. |
| 2655327 | 6/1991 | France. |

OTHER PUBLICATIONS

Ceramic Engineering and Science Proceedings, vol. 10, No. 7/8, Westerville, Ohio, pp. 938-951, V. S. R. Murthy et al. "Interfacial Microstructure and Crystallization in SiC-Glass Ceramic Composites", p. 944.

Ceramic Engineering and Science Proceedings, vol. 11, No. 9/10, Westerville, Ohio, pp. 1648-1660, T. Yamamura et al. "Characteristics of a Ceramic Matrix Composite Using a Continuous Si-Ti-C-O Fiber", p. 1653.

Primary Examiner—Ellis P. Robinson
Assistant Examiner—Timothy M. Speer
Attorney, Agent, or Firm—Nikaido, Marmelstein, Murray & Oram

[57] ABSTRACT

The invention concerns a composit material with a glass-ceramic or ceramic matrix obtained by the sol-gel process and reinforced by fibers, wherein said matrix is MLAS matrix and wherein said fibers are at least 17% by volume Si-Ti-C-O fibers. FIG. 2 shows the flexural stress-strain curves (compression and tension) for a composite material containing 24% by volume of Si-Ti-C-O fiber in a MLAS matrix. Shaped articles produced from the composit material according to this invention can be used in the aeronautical and spatial industries and in motor vehicle engines.

10 Claims, 2 Drawing Sheets

COMPOSITE MATERIAL WITH A GLASS-CERAMIC OR CERAMIC MATRIX OBTAINED BY THE SOL-GEL PROCESS AND REINFORCED BY FIBERS BASED ON SILICON CARBIDE, ITS MANUFACTURE AND ITS APPLICATIONS

Composite material with a glass-ceramic or ceramic matrix obtained by the sol-gel process and reinforced by fibers based on silicon carbide, its manufacture and its applications.

FIELD OF THE INVENTION

The invention concerns a new composite material with a glass-ceramic or ceramic matrix obtained by the sol-gel process and reinforced by silicon carbide based fibers which, apart from carbon and silicon, comprise titanium, oxygen and possibly boron, the invention also concerning the manufacture and applications of said material.

BACKGROUND OF THE INVENTION

The manufacture of composite ceramic materials with a glass-ceramic or ceramic matrix obtained by the sol-gel process and reinforced by silicon carbide fibers is described in particular in the patent application FR 89 15987 published under the No. 2 655 327 and in the European patent application No. 88 403231.9 published under the No. 0 322 295 of the present Applicant.

The silicon carbide (SiC) fiber generally used in the production of composites, in particular by making use of the sol-gel process and which is essentially and even totally constituted by SiC, such as, for example, the fiber commercialized by the NIPPON-CARBON company under the name NICALON ® does have a certain number of drawbacks concerning its implementation when used with the known methods, such as filament winding or weaving, for preparing the fibrous reinforcement. In fact, these methods result in frequent ruptures on pulleys, dies and other means for placing of the fiber, these ruptures being linked to the presence of defects of discontinuity type of the monofilaments constituting the fiber. These defects, which do not exist in the fiber, as commercialized, appear during the fiber desizing operation which is essential prior to implementing the process for manufacturing the composite (see, for example, patent application FR 2 655 327, page 13, lines 28 to 34).

SUMMARY OF THE INVENTION

The object of the invention is to embody a composite material of the above-mentioned type including a fibrous reinforcement formed of fibers proving to be more advantageous from the technological point of view as concerns their handling and having less defects, especially after desizing, thus making it possible to obtain pieces having improved mechanical characteristics for an equivalent proportion of fibers.

These aims are, according to the invention, achieved by means of the use of silicon-titanium-carbon-oxygen or Si-Ti-C-O type fibers instead of the traditionally used SiC type fibers.

T. YAMAMURA et al. succinctly described in Ceram. Eng. Sci. Proc. 11 (9–10), 1648–1660 (1990) the manufacture of composites with a ceramic matrix obtained from Si-Ti-C-O powder and reinforced by Si-Ti-C-O fibers. However, the method they use does not involve a sol-gel process but solely involves the hot-pressing in an argon atmosphere of a laminated structure alternating weaved fibers and films of powder. This document does not suggest that, in a method making used of a sol-gel process, it is possible to obtain the unexpected advantages, described subsequently in this document, provided by the present invention.

The invention concerns a composite material with a glass-ceramic or ceramic matrix obtained by the sol-gel process and reinforced by SiC based fibers in which said fibers are Si-Ti-C-O fibers.

V. S. R. MURTHY et al., in Ceram. Eng. Sci. Proc. 10 (7–8), 938–951 (1989), succintly describe a composite material with a BAS glass-ceramic matrix, that is a material formed of BaO, $Al_2O_3$ and $SiO_2$, obtained by the sol-gel process and reinforced by Si-Ti-C-O fibers, namely fibers commercialized by the UBE INDUSTRIES company under the name Tyranno ®. The authors state that the Tyranno ® fibers undergo severe degradation during hot-pressing due to indiffusion of matrix elements. They state that the necessity for low-cohesion interfaces dictate that the fibers be precoated.

This document would therefore dissuade one skilled in the art from using Si-Ti-C-O fibers without precoating them for manufacturing other composite materials with a glass-ceramic or ceramic matrix obtained by the sol-gel process.

According to the invention, contrary to what could be deduced from the contents of this document, the problems referred to above are not encountered when a matrix is used essentially including $Li_2O$, $Al_2O_3$ and $SiO_2$, and possibly MgO, namely a so-called LAS or MLAS matrix, respectively with non-precoated so-called Si-Ti-C-O fibers.

Accordingly, one of the subject matters of the present invention is a composite material with a glass-ceramic or ceramic matrix obtained by the sol-gel process and reinforced by SiC based fibers, wherein said matrix is essentially a $Li_2O$-$Al_2O_3$-$SiO_2$ (LAS) or MgO-$Li_2O$-$Al_2O_3$-$SiO_2$ (MLAS) matrix and wherein said fibers are Si-Ti-C-O fibers.

The Si-Ti-C-O fibers used in the composite material of the invention are advantageously constituted, by weight, of 48 to 57% of Si, about 2% of Ti, 30 to 32% of C, 12 to 18% of O and 1% or less of B.

Fibers of this type may be obtained in particular from an organo-metallic polymer, such as polytitanocarbosilane (PTC) in accordance with the teachings of T. YAMAMURA et al. in J. Mater. Sci. 23, 2589–94 (1988).

A commercial product of this type, which may be used in the present invention, is TYRANNO LOX M ® sold by the UBE INDUSTRIES Company Limited (Japan) and which is constituted, by weight, of about 53% of Si, 2% of Ti, 31% of C, 13% of O and 1% or less of B.

The composite material of the invention may be obtained in a way similar to the known methods of the prior art, especially those described in the patent applications FR 2 655 327 and EP 0 322 295 referred to above.

This material may be more particularly obtained, for example, according to a method essentially consisting in:

1) preparing, by the sol-gel process, a glass-ceramic powder having the desired composition for the formation of the glass-ceramic or ceramic material, 2) after a possible desizing, impregnating the Si-Ti-C-O fibers with a sol or barbotine containing the glass-ceramic powder, 3) transforming the impregnated fibers thus obtained into a sheet prepreg, and 4) submitting the prepreg thus obtained to a heat treatment for densifying and ceramizing the matrix.

According to an advantageous embodiment, in step 3), the impregnated fibers are coiled onto a mandrel for obtaining said sheet prepreg.

According to another advantageous embodiment of the invention, the sol or barbotine used to impregnate the fibers contains a crystallization retarding agent, especially boric anhydride $B_2O_3$, or a precursor of this compound. This agent makes it possible to preserve the vitreous phase during the densification step of the material and obtain a material with low residual porosity, without using any nucleating agent.

Regardless of the manufacturing process used to produce the composite material of the invention, it is established that in equal proportions, the Si-Ti-C-O fibers provide the obtained material with certain physical characteristics such as stress at maximum rupture or stress at rupture limit (UFS) and stress at maximum elastic limit or stress at elastic limit (CFS), which are clearly superior to those obtained with conventional SiC fibers.

Thus, the invention makes it possible to obtain materials having the followig specific properties (brought down to a unit fiber rate):

stress at maximum rupture: about 3150 MPa
stress at maximum elastic limit: about 1300 MPa
deformation or strain at elastic limit: about 0.26% whereas with NICALON® SiC fibers, in the same conditions, about 1580 MPa, 950 MPa and 0.26% are obtained, respectively.

Furthermore, the proportion of Si-Ti-C-O fibers required to obtain a given value of these physical characteristics is much lower than that required for conventional SiC fibers (about half).

These unexpected effects make it possible to use smaller quantities of fibers and obtain the composite materials of the invention in a shorter period of time.

The present invention, which provides composite materials having remarkable properties, may be applied to a wide range of fields, such as in particular in the aeronautical and spatial industries, for applications requiring good resistance at average or high temperatures (from about 600° to 2500° C.), that is in particular nozzle throats or heat protection materials. It may also be used for the manufacture of certain parts of motor vehicle engines, such as turbo-compressor rotors, heat exchangers, pistons, transmission shafts, etc.

DESCRIPTION OF PREFERRED EMBODIMENTS AND COMPARATIVE EXAMPLE

Figure 1:
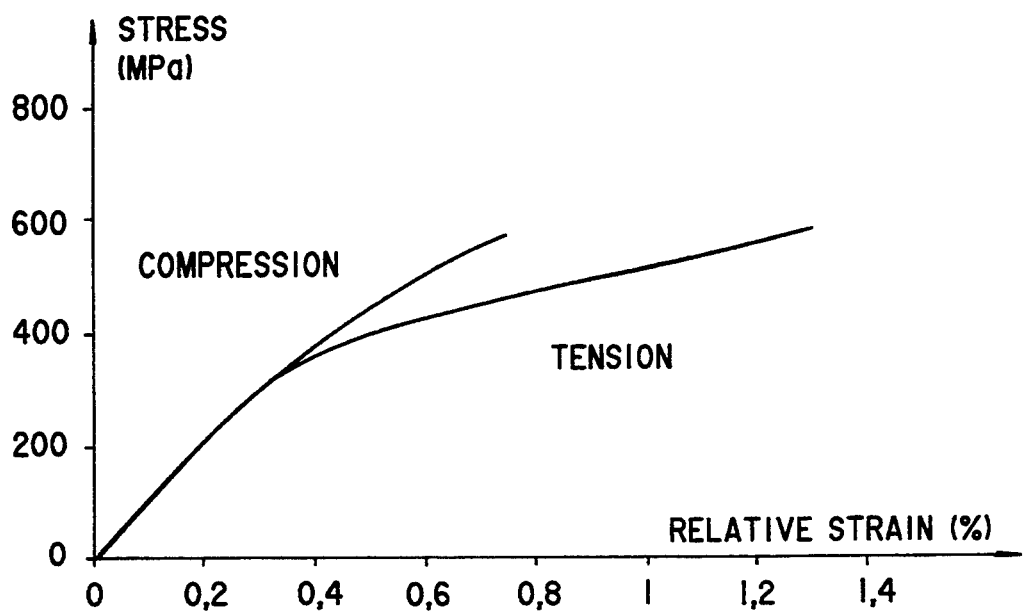
FIG. 1 shows the flexural stress-strain curves (compression and tension) for a composite material containing 17% by volume of Si-Ti-C-O fibers in a MLAS matrix.

The following non-restrictive examples are given to illustrate and explain the invention in more detail.

EXAMPLE 1

$MgO-Li_2O-Al_2O_3-SiO_2$ composition + long fibers.

A glass-ceramic powder was prepared having the following formula: $0.5\ MgO-0.5\ Li_2O-Al_2O_3-4SiO_2$, for example as described in patent application FR 2 655 327.

The fibers used were long fibers of silicon carbide commercialized by the UBE company under the reference Tyranno Lox M ®. Resin-based sizing of the fibers was eliminated by immersing them in an equivolumetric mixture of acetone and ethyl alcohol for 12 hours.

A barbotine was prepared containing 70 g of the glass-ceramic powder oxidized and dehydrated at 500° C. and disagglomerated on a 50 µm sieve. The 70 g were mixed with a viscous solution of 10 g of methyl polymethacrylate in 100 cm³ of monochlorobenzene. The fibers were impregnated by the barbotine (prepared with said powders) and then wound onto a mandrel allowing for the embodiment of sheets of preimpregnated fibers (unidirectional after cutting and flattening).

The preimpregnated sheets were cut into square blocks measuring 70×70 mm which were stacked in a graphite mould having the same section so as to carry out the hot densification and ceramization treatment: rise of temperature of 10° C./min up to 1025° C. under vacuum with a first stage of 30 mins at 280° C. so as to eliminate the methyl polymethacrylate, one second stage of 30 mins at 550° C. favoring rearrangement, one third stage of 30 mins at 830° C. favoring crystallization and dehydration, continuation of heating at the rate of 5° C./min under nitrogen up to about 1330° C. and a stage of about 10 rains at this temperature with pressing under 11 MPa and controlled cooling at the rate of 0° C./min under nitrogen (under pressing up, to 1000° C.).

The composite material obtained had a fiber volume fraction of 17% and an apparent density of 2.44 (relative apparent density 0.99). Analysis with X-rays showed the preponderant presence of a solid solution of β spodumene and α cordierite.

The breaking strength (UFS), determined by the four points bending test on a test bar with a width of 10 mm and a thickness of 2.5 mm, the distance between the supports being 15 and 50 mm and the loading speed being 0.1 mm/min, was 570±35 MPa.

The stress at the elastic limit (CFS) was 240 MPa and the elongation at the elastic limit was 0.25%.

FIG. 1 represents the curves of tension and compression stresses expressed in MPa, as functions of the percentage of relative deformation or strain, for the composite obtained in this example 1.

EXAMPLE 2

The procedure was exactly the same as in Example 1, apart from the fact that the fiber volume fraction was 25% instead of 17% of the composite material obtained.

According to the same bending test, the breaking strength was then 750 MPa, the stress at the elastic limit was 290 MPa and the elongation at elastic limit was 0.27%.

Figure 2:
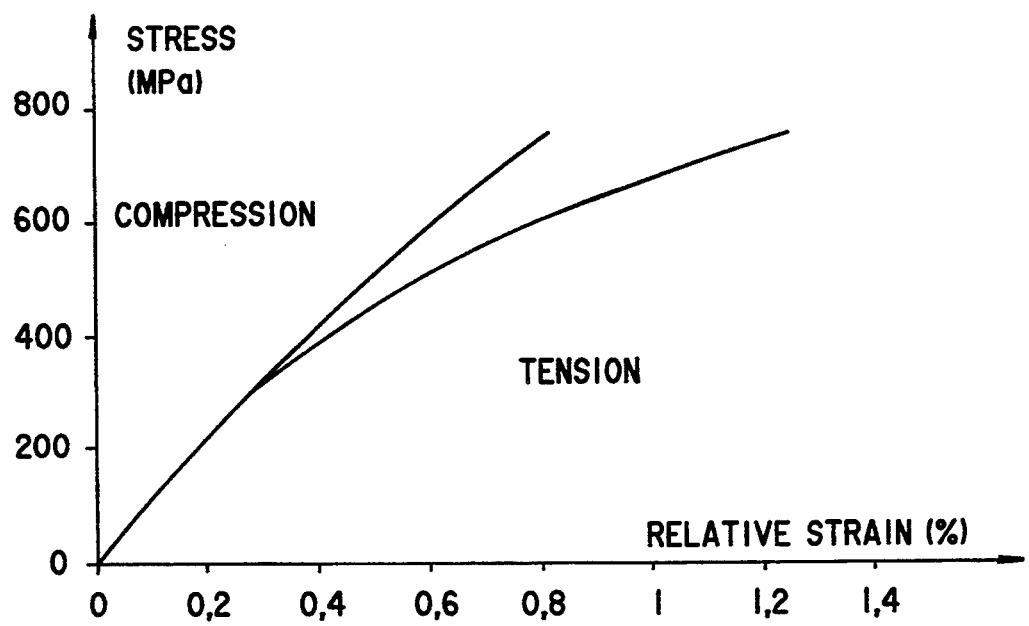
FIG. 2 shows the flexural stress-strain curves (compression and tension) for a composite material containing 24% by volume of Si-Ti-C-O fibers in a MLAS matrix.

FIG. 2 represents the curves of tension and compression stresses expressed in MPa, as functions of the percentage of relative deformation or strain, for the composite obtained in this example 2.

EXAMPLE 3 (comparative)

The procedure was the same as in Example 1 but NICALON® SiC fibers (i.e. without titanium) were used. The fiber volume fraction in the composite material was 33%. The breaking strength was 520 MPa, the stress at the elastic limit was 310 MPa and the elongation at the elastic limit was 0.27%.

Figure 3:
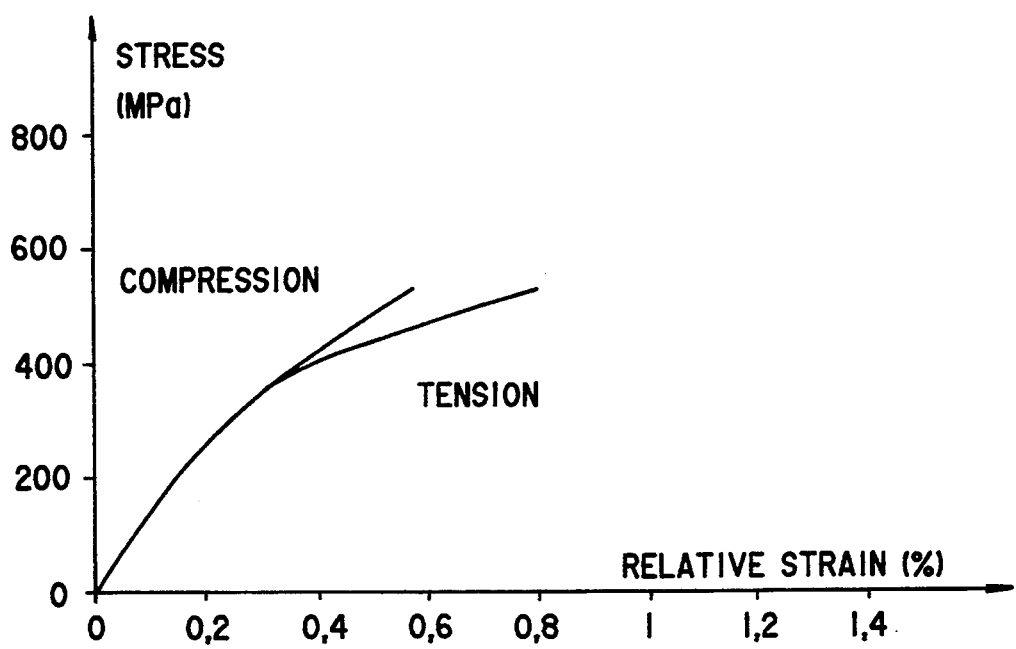
FIG. 3 shows the flexural stress-strain curves (compression and tension) for a composite- material containing 33% by volume of Nicalon ® SiC fibers in a MLAS matrix.

FIG. 3 represents the curves of tension and compression stresses expressed in MPa, as functions of the percentage of relative deformation or strain, for the composite obtained in the comparative example 3.

A comparison of the various curves makes it possible to assert that the composite material obtained in accordance with the invention has clearly improved characteristics for much smaller fiber volume fractions.

Thus, the composite material of the invention is one requiring less fibers, easier to use, and having improved characteristics compared with known composite materials obtained by the same process. In particular, the presence of a smaller quantity of fibers inside a given volume means that they are better protected against oxidation by a larger matrix volume.

The preceding examples illustrate that the materials obtained in accordance with the invention have the following specific properties (reduced to a unit fiber rate):
   stress at maximum rupture: about 3150 MPa
   stress at maximum elastic limit: about 1300 MPa
   deformation or strain at elastic limit: about 0.26%
whereas with NICALON® SiC fibers, 1580 MPa, 950 MPa and 0.26%, respectively are obtained.

The fiber used in Examples 1 and 2 according to the invention exhibits per sea rupture stress of about 3300 MPa. Therefore, the properties of the fiber contained in the composite material of the invention are retained.

The above described examples are in no way restrictive. In particular, it is possible to differently combine or modify the described characteristics, especially as regards the formula of the glass-ceramic composition, the procedure for preparing the gel, the heat dehydration and oxidation treatments and the ceramization treatments.

We claim:

1. A composite material comprising a $MgO\text{-}Li_2O\text{-}Al_2O_3\text{-}SiO_2$ (MLAS) glass-ceramic or ceramic matrix obtained by the sol-gel process reinforced with at least 17% by volume Si-Ti-C-O fibers.

2. A composite material according to claim 1, wherein the Si-Ti-C-O fibers are constituted, by weight, of 48 to 57% of Si, about 2% of Ti, 30 to 32% of C, 12 to 18% of O, and 1% or less of B.

3. A composite material according to claim 2, wherein the Si-Ti-C-O fibers are constituted, by weight, of about 53% of Si, 2% of Ti, 31% of C, 13% of O, and 1% or less of B.

4. A composite material according to claim 1, which exhibits the following specific properties reduced to a unit fiber rate:
   stress at maximum rupture: about 3150 MPa
   stress at maximum elastic limit: about 1300 MPa and
   deformation or strain at elastic limit: about 0.26%.

5. A shaped article comprising the composite material according to claim 1.

6. An element of an aeronautical apparatus comprising a shaped article as claimed in claim 5.

7. An element of a spacecraft comprising a shaped article as claimed in claim 5.

8. An element of a motor vehicle engine comprising a shaped article as claimed in claim 5.

9. A shaped article as claimed in claim 5 wherein said reinforcement consists essentially of Si-Ti-C-O fibers.

10. A composite material as claimed in claim 1 wherein said reinforcement consists essentially of uncoated Si-Ti-C-O fibers.

* * * * *

UNITED STATES PATENT AND TRADEMARK OFFICE
CERTIFICATE OF CORRECTION

PATENT NO. : 5,399,440                          Page 1 of 2
DATED : March 21, 1995
INVENTOR(S) : Lespade, et al It is certified that error appears in the above-indentified patent and that said Letters Patent is hereby corrected as shown below:

In the abstract:

line 1, delete "composit" and insert therefor -- composite --.

line 3, after "said matrix is" please add -- a --.

line 9, delete "composit" and insert therefor -- composite --.

column 2, line 46, delete "0" and insert therefor -- O --.

UNITED STATES PATENT AND TRADEMARK OFFICE
CERTIFICATE OF CORRECTION

PATENT NO. : 5,399,440
DATED : March 21, 1995
INVENTOR(S) : Lespade, et al

It is certified that error appears in the above-indentified patent and that said Letters Patent is hereby corrected as shown below:

column 4, line 41, delete "rains" and insert therefor -- mins --.

column 4, line 42, delete "0°" and insert therefor -- 20° --.

column 4, line 64, delete "25%" and insert therefor -- 24% --.

column 5, line 38, delete "sea" and insert therefor -- se a --.

Signed and Sealed this

Twenty-eighth Day of May, 1996

Attest:

BRUCE LEHMAN

*Attesting Officer*  *Commissioner of Patents and Trademarks*